United States Patent [19]

Brazas, Jr. et al.

[11] Patent Number: 4,783,393

[45] Date of Patent: Nov. 8, 1988

[54] DYE MIXTURES AND OPTICAL RECORDING ELEMENTS CONTAINING SAME

[75] Inventors: John C. Brazas, Jr.; Harold T. Thomas, both of Rochester; Neil F. Haley, Fairport; Michael W. Fichtner, Rochester, all of N.Y.

[73] Assignee: Eastman Kodak Company, Rochester, N.Y.

[21] Appl. No.: 923,051

[22] Filed: Oct. 27, 1986

[51] Int. Cl.$^4$ .......................... G03C 1/72; G11B 7/24
[52] U.S. Cl. ...................... 430/270; 430/945; 430/944; 346/135.1; 252/589; 252/587
[58] Field of Search ............. 252/589, 587; 430/945, 430/944, 270; 346/135.1

[56] References Cited

U.S. PATENT DOCUMENTS

| | | | |
|---|---|---|---|
| 3,588,216 | 6/1971 | Bloom | 252/587 |
| 4,050,938 | 9/1977 | Smith, Jr. et al. | 96/84 R |
| 4,219,826 | 8/1980 | Bloom et al. | 346/135.1 |
| 4,320,489 | 3/1982 | Crandall et al. | 369/111 |
| 4,412,231 | 10/1983 | Namba et al. | 346/135.1 |
| 4,499,165 | 2/1985 | Molaire | 430/17 |
| 4,585,722 | 4/1986 | Morinaka et al. | 430/201 |

FOREIGN PATENT DOCUMENTS

| | | |
|---|---|---|
| 3505751 | 8/1986 | Fed. Rep. of Germany . |
| 203488 | of 1985 | Japan . |
| 8384 | 1/1986 | Japan . |
| 14988 | 1/1986 | Japan . |
| 1263910 | 2/1972 | United Kingdom . |

*Primary Examiner*—Paul R. Michl
*Assistant Examiner*—Cynthia Hamilton
*Attorney, Agent, or Firm*—John R. Everett

[57] ABSTRACT

A dye mixture comprising at least two different unsymmetrical bis[1,2-diphenyl-1,2-ethanedithiolato(2−)-S,S']-platinum compounds is disclosed. The mixture is useful in optical recording layers.

3 Claims, No Drawings

DYE MIXTURES AND OPTICAL RECORDING ELEMENTS CONTAINING SAME

BACKGROUND OF THE INVENTION

1. Field of the Invention

This invention relates to mixtures of platinum dithiolene dyes and their use in optical recording elements.

2. Background of the Invention

In optical recording processes generally a laser beam is modulated, e.g., pulsed corresponding to a pattern of information, and focused onto the surface of a recording layer of a recording element.

The recording layer absorbs sufficient energy at the wavelength of the laser beam to cause small portions of the layer to burn, evaporate or otherwise deform. Generally, there is continuous relative motion between the laser and the layer so that, as the laser is pulsed or modulated, discrete pits or holes of varying length are created in the layer. The length and spacings of these holes constitute the encoded information.

The resulting recorded information is generally read back by turning down the power of the writing laser or by using another laser to which the layer is transparent, thereby precluding the reading laser from further physically altering the recorded layer. The reading beam is disposed to follow the same path as the recording beam. When the read beam is significantly absorbed by the recording, an optical density difference is detected between recorded and unrecorded areas. When the read beam is transmitted by the layer, light scattering caused by the recorded and unrecorded areas are detected as an optical density difference.

This density difference is detected by a photodetector positioned to receive laser radiation reflected from the underlying support where holes have been formed in the recording layer (in the case of a transmissive support). The detected density variations are converted back into electrical signals corresponding to the information recorded.

Optical recording elements comprising a binderless layer of a single platinum dithiolene dye as the recording layer are known. It is also known to coat a platinum dithiolene dye with a binder to form an optical recording layer. However, in each instance upon incubation crystallization of the dye occurs. Crystallization has a negative affect upon the carrier-to-noise ratio of amorphous recording layers. Moreover, experiments have shown that it is extremely difficult to dissolve sufficient amounts of such dyes in conventional coating solvents to make optical recording layers having the desired sensitivity.

SUMMARY OF THE INVENTION

The present invention provides a dye mixture comprising at least two different unsymmetrical bis[1,2-diphenyl-1,2-ethanedithiolato(2−)-S,S']-platinum compounds.

It has been found that vacuum deposition of such mixtures, with or without a binder, results in amorphous optical recording layers in which crystallization does not occur during incubation. By amorphous, we mean that the recording layer is non-crystalline.

In a preferred embodiment the compounds of the mixtures have one or more of the following structures (I and II):

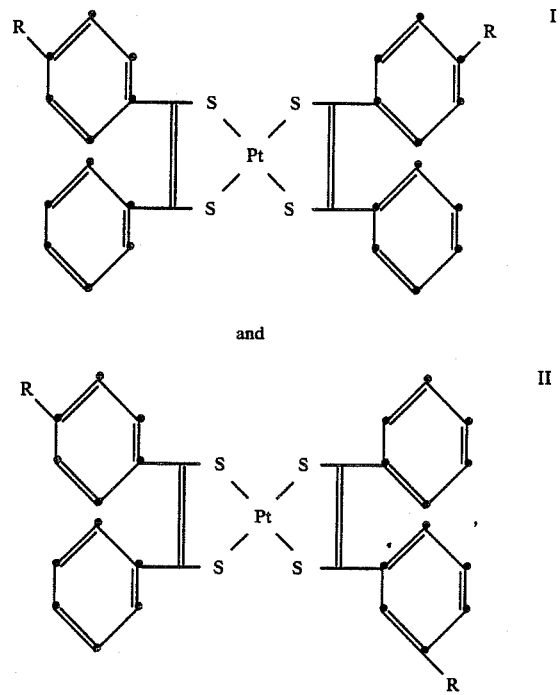

wherein R, which may be the same or different in structures I and II, represents a lower alkyl or alkoxy group having up to 6 carbon atoms such as methyl, butyl, isopropyl, methoxy, butoxy or propoxy.

DETAILS OF THE INVENTION

The optical recording elements of the invention comprise a support having thereon a recording layer of a dye mixture of this invention, with or without a binder.

Depending upon the desired mode of reading the element, the support is either reflective or transparent. In the case of a reflective support, preferably each side of the support is reflective and a recording layer may be provided on each side. The support is any of a wide variety of materials including for example, glass plate, glass plate coated with a 0.05 μm (500 Å) thick reflective layer of aluminum or gold, paper, clay, wood or metal or a resin film or plate such as poly(ethylene terephthalate), poly(methyl methacrylate), poly(vinyl chloride), polystyrene or cellulose acetate. Important characteristics of the support are that it has a relatively high melting point (to avoid deformation during recording), has a very smooth surface (to minimize noise), and be capable of being coated with a layer of an amorphous material. There should, of course, be good adhesion and no significant chemical reactivity between the layer and the support.

To improve the smoothness of the support, a smoothing layer may be applied thereto. The smoothing layer is generally formed from low-viscosity, polymerizable fluid which is coated on the surface of the support. Following coating, polymerization of the fluid produces a microsmooth surface on the support. The support can be made reflective by vacuum metalization of the smooth surface. In preferred embodiments, the polymerizable fluid comprises photopolymerizable monomers. Preferably, the monomers or mixtures of monomers are low-viscosity fluids in the absence of a solvent. Useful polymerizable fluid compositions are described in U.S. Pat. Nos. 4,446,233; 4,092,173 and 4,171,979.

An especially useful smoothing layer is disclosed in U.S. patent application Ser. No. 766,992 filed Aug. 19, 1985, in the name of Molaire et al and entitled "Optical Recording Element Having Polymerized Homopolymer Smoothing Layer." It comprises a crosslinked homopolymer in which the polymerized, crosslinked recurring unit is derived from a single monomer having the structure.

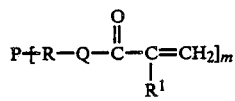

Q represents $-(CH_2)_nO-$ or $(CH_2CH_2O)_n$;
P represents a benzene or a cyclohexane nucleus;
R represents

or $-O-$;
$R^1$ represents hydrogen or methyl;
$n$ is 2 to 10; and
$m$ is 2 to 4.

These monomers are polymerizable and cross-linkable with radiant energy such as UV light. Such monomers are disclosed in U.S. Pat. No. 4,322,490. Representative monomers of conforming to the above structure are presented below:

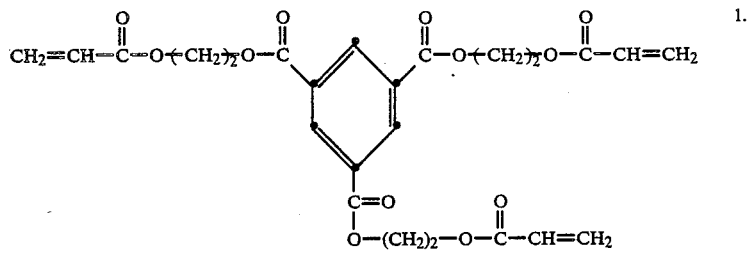

1.

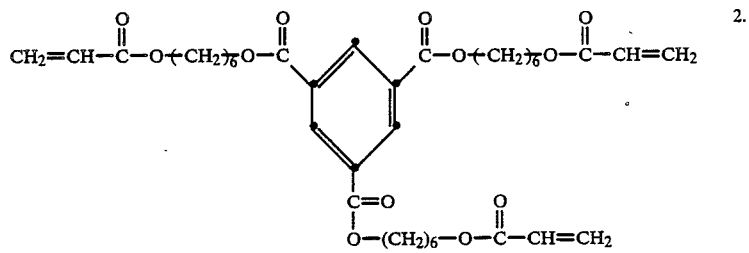

2.

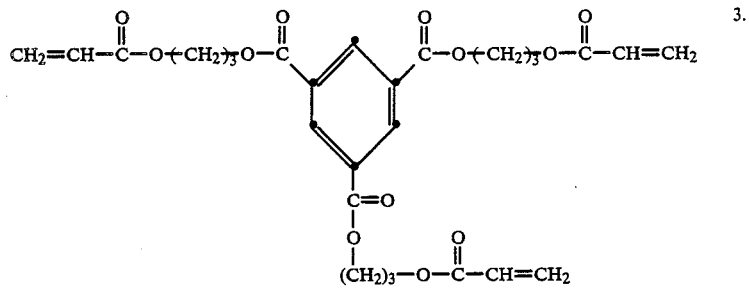

3.

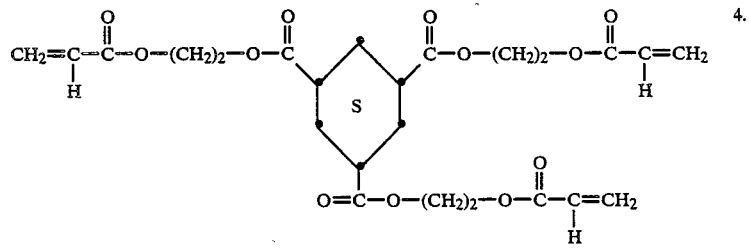

4.

-continued

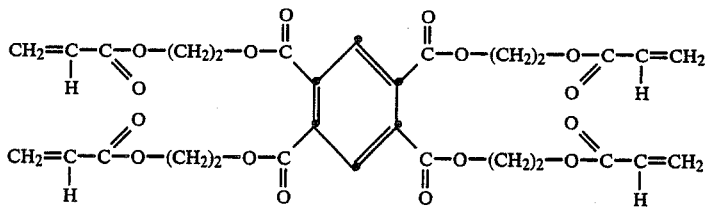

Smoothing layer formulation comprising these monomers generally include a photoinitiator composition as described in U.S. Pat. No. 4,485,161. The photoinitiator composition comprises, for example, an amine activator and a 3-ketocoumarin photosensitizer. However, almost any photoinitiator composition is useful.

The smoothing layer formulations are made by combining a monomer and an appropriate solvent with a sensitizer and mixing at a constant temperature until solution is obtained. Then an activator is added to the solution and mixed until a clear solution is obtained. The order of combining the components is not essential. It is necessary, however, to obtain a clear solution.

In general, the smoothing layer formulations will comprise, on a dry weight to weight basis, from 50 to 93 percent of the selected monomer; from 2 to 10 weight percent of activator; and when desired, 1 to 5 weight percent of the photosensitizer in an appropriate solvent.

The recording layer comprising one of the dye mixtures of the invention, with or without binder, is vacuum coated. The thickness of the recording layer according to the present invention is not critical. However, best results are obtained when the thickness of the layer is between about 0.1 and about 10 μm.

The recording layers comprising a dye mixture of this invention and a binder ideally have an absorption factor of at least 20. It is clear from the fact that binderless layers of the dye mixtures are operable as optical recording layers, one need only avoid using too much binder in the layers to achieve an absorption factor of at least 20. Depending on the dye mixture selected, layers comprising up to 75 weight percent binder should be operable. Such layers are capable of producing depressions or holes (or pits) surrounded by sharply defined ridges when subjected to the writing laser. This type of deformation can be read back using a read beam which is (1) not significantly absorbed by the recording layer or (2) at low enough energy at the absorbing wavelength to avoid altering the encoded information. By "sharply defined ridge" is meant that the ridge and hole/depression have noticeable boundaries and that, as measured in the plane of the undeformed outer surface of the layer, the width of the ridge is less than or equal to the breadth of the hole depression. These dimensions can be measured from an electron micrograph of the pits.

The "absorption factor" of the recording layer is defined as the product of the weight fraction of dye included in the layer and the molar extinction coefficient of the dye at the wavelength of the recording beam of choice divided by the molecular weight of the dye (MW), and having the units of liter per gm-cm. Where necessary, the effect of the binder on the absorption spectrum of the dye is taken into consideration in calculating the absorption factor of a dye-binder amorphous material. A procedure for this correction is described in U.S. Pat. No. 4,380,769 (column 8, line 48–61).

Useful binders are disclosed in U.S. Pat. No. 4,499,165. The useful binders are mixtures of compounds. The mixtures are (a) amorphous, (b) solid at about 20° C. and (c) comprises at least two different compounds each having at least two linking components joining one multivalent organic nucleus with at least two organic nuclei wherein at least one of the multivalent organic nucleus and the organic nuclei is a multicyclic aromatic nucleus.

The thickness and absorption factor of the recording layers used in the elements of the present invention can be optimized by a method which is described in *Research Disclosure,* Item 20635, June 1981, published by Industrial Opportunities Ltd., Homewll, Havant, Hampshire, PO9, 1EF, UK.

A thermal and mechanical barrier layer is optionally coated over the recording layer of the optical recording element. The purpose of this thermal and mechanical barrier layer is to protect the recording layer from defects such as scratches, dirt and fingerprints. Another function of the thermal and mechanical barrier layer is to prevent the material which is vaporized or ablated from the recording layer from depositing on the optical system and other components of the recording apparatus.

Many materials have been proposed for the thermal and mechanical barrier layer. Bartolini et al in "Materials for Optical Recording" in a final report for Contract MDA904-76-C-0429 for the National Security Agency, August, 1977, reported experiments with a wide variety of overcoat materials. Especially useful thermal and mechanical barrier layers comprising water-soluble polymers having a glass transition temperature when dry of at least 100° C. are disclosed in Hollister et al's U.S. Pat. No. 4,430,655.

Optimization of the recording elements of the present invention is described in U.S. Pat. No. 4,360,908 of Howe and Wrobel. Preferred disc configurations are described in U.S. Pat. No. 4,447,899 of Geyer and Howe.

The dye mixtures of this invention were prepared in one reaction vessel according to Example 1.

EXAMPLE I

A mixture of the invention was prepared by mixing 1.61 g (0.006 mole) of t-butylbenzoin, 1.52 g (0.006 mole) of isopropylbenzoin, 1.45 g (0.006 mole of methoxybenzoin and 8.9 g (0.04 mole) of phosphorous pentasulfide in 150 mL of dioxane. The mixture was heated at reflux temperature for three hours. The reaction was cooled to room temperature and filtered to remove insoluble material. The filtrate was treated with 3.74 g (0.009 mole) of potassium tetrachloroplatinate in 50 ml of water and brought to reflux for two hours. After cooling to room temperature, the reaction mixture was stirred overnight. The solvents were removed under vacuum. The residue was triturated with acetonitrile and the solid collected by filtration. The solid was extracted for four hours with methylene chloride. The methylene chloride extractions were concentrated and the residue again triturated with acetonitrile and filtered. The solid was washed with methanol and pentane to give 4.4 g of dark material. λ-max in methylene chloride=819 nm (e=37,800).

The three different R substituents involved (t-butyl, isopropyl, and methoxy) in the reaction and the random nature of the reaction, a mixture of at least six different dyes was obtained without considering the "cis-trans" isomer possibilities, wherein the R substituents are on the same side or diagonally opposed across metal coordination centers.

Other dye mixtures were prepared by the same procedure described in Example 1, except using the starting benzoins shown in Table I, to produce dye mixtures of the invention.

TABLE I

| Example | Benzoins Employed | | | | Mole Ratio of Benzoins Employed |
|---|---|---|---|---|---|
| 2 | A | B | | | 1/1 |
| 3 | A | C | | | 1/1 |
| 4 | B | C | | | 1/1 |
| 5 | A | C | D | | 1/1/1 |
| 6 | A | C | D | E | 1/1/1/1 |
| 7 | A | B | C | | 1/1/1 |

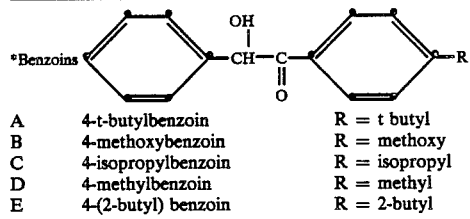

*Benzoins

| A | 4-t-butylbenzoin | R = t butyl |
| B | 4-methoxybenzoin | R = methoxy |
| C | 4-isopropylbenzoin | R = isopropyl |
| D | 4-methylbenzoin | R = methyl |
| E | 4-(2-butyl) benzoin | R = 2-butyl |

The suitability of the recording elements comprising recording layers of the dye mixtures of this invention was determined in the following examples using a "static pit tester". The static pit tester provides automated facilities for exposing standard test patterns on 2" by 2" glass slides or film samples with a laser. A microcomputer using FORTH language was used to control the sample position and the laser power.

Layers of the dye mixture, with or without a binder, were prepared by vacuum coating methods.

Each layer was then exposed, in the static pit tester, to a power series array to produce pits on 4 micron centers at each of six power levels (2, 3, 4, 6, 8 and 10 milliwatts) on the sample, with a 50 nanosecond pulse duration from an 830 nanometer wavelength GaAlAs diode laser. This pattern was repeated at 2 mm intervals across the sample for a total of thirteen test patches. These test patches were examined with a Nomarsky differential interference contrast microscope to determine the presence or absence of pits in a particular coating. A layer is considered useful when a pit is formed at any of the six power levels at any position of the coating.

Pits were formed in each of the fourteen coated compositions.

EXAMPLE 8

A sample of the dye mixture of Example 5 was vacuum evaporated, without a binder, to a thickness of 0.11 μm onto a glass slide which had been precoated by vacuum deposition with a reflective layer of chromium and gold overcoated with a smoothing layer. The coating was incubated for one week at 60° C. and 30% relative humidity, then stored for 6 months at ambient conditions. The resulting element was written on with a GaAlAs diode laser using the static pit tester. Pits were written on the glass slide over a laser power series of 9.7, 8.4, 6.9, 5.3, 4.8, and 3.6 mW and through a time series of 40, 50, 100, 200, 400, 1000, 2000, 5000, 10,000 and 30,000 ns. Photomicrographs of the slide at 700× and 1400× magnification showed no crystallization of the recording media, and good pit formation over most of the power vs. time exposure series.

EXAMPLES 9–14

Three different dye mixtures (examples 5, 6 and 7) were separately coated with one of the two following binders to make six different optical elements:

BINDERS

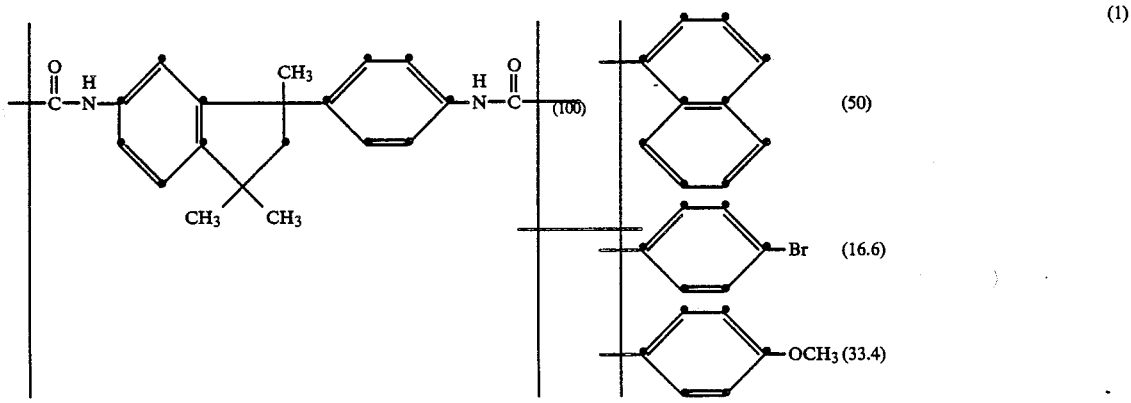

(1)

-continued
BINDERS

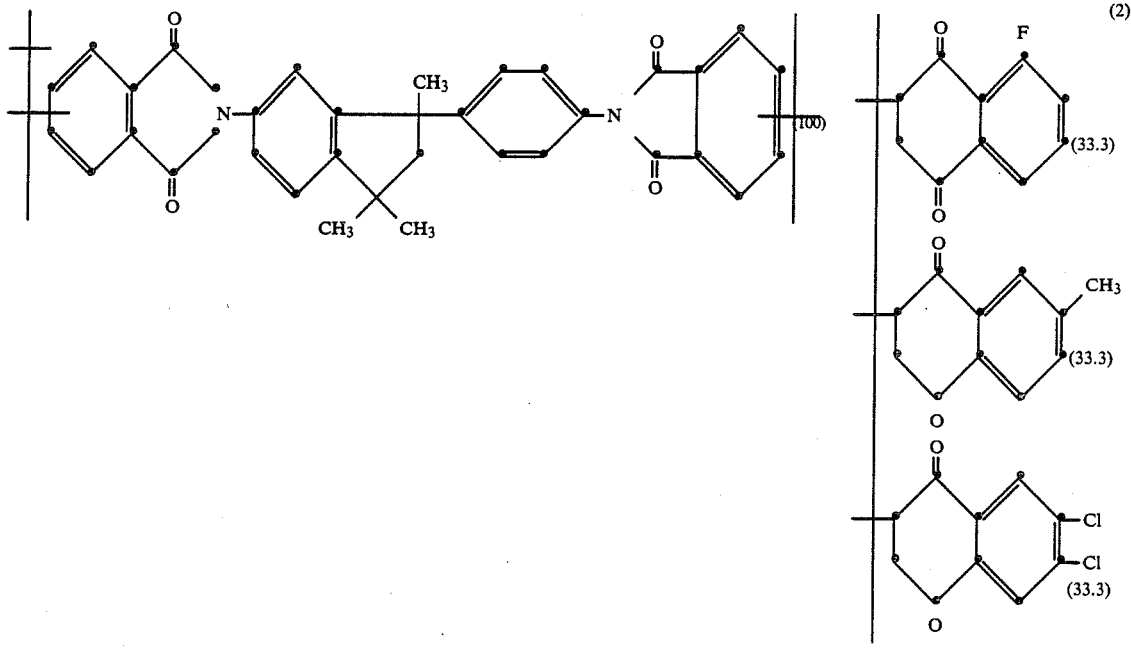

The structure of binders (1) and (2) are designed to emphasize the random nature of mix of compounds making up the binder. Such binders are fully disclosed in U.S. Pat. No. 4,499,165.

Each dye mixture and binder was vacuum coated and sandwiched between 20 nm silicon dioxide overcoat and 100 nm gold reflecting layer. The vacuum coated layers were near 0.11 μm thick and contained a dye mixture/binder ratio of 1/1. The combinations of the materials are listed below.

| Example No. | Dye Mixture | Binder No. |
|---|---|---|
| 9 | Example 7 | 2 |
| 10 | Example 7 | 1 |
| 11 | Example 5 | 2 |
| 12 | Example 5 | 1 |
| 13 | Example 6 | 2 |
| 14 | Example 6 | 1 |

Each element was incubated at 60° (140° F.) and 30% relative humidity for a period of six weeks. No defects were identified as crystallization in the vacuum coated optical recording layers.

EXAMPLE 13

An optical recording composition comprising the dye mixture of Example 1 and binder 2 was thermally evaporated in vacuo to a final thickness of $1.10 \times 10^{-6}$ mm onto a reflecting layer of chromium ($10^{-7}$ mm) and $A_u$ ($10^{-5}$ mm). The reflective layer rested on a smoothing layer which in turn was coated on a glass support. The write and read wavelengths were 830 and 633 nm respectively. The maximum CNR (Carrier-to-Noise Ratio) observed was 65.8 dB at a write laser power on 10 mW.

The invention has been described in detail with particular reference to preferred embodiments thereof, but it will be understood that variations and modifications can be effected within the spirit and scope of the invention.

We claim:
1. An optical recording element comprising a support and an optical recording layer of an amorphous binderless coating of a dye mixture comprising at least two different unsymmetrical alkyl or alkoxy substituted bis[1,2-diphenyl-1,2-ethanedithiolato(2−)-S,S']platinum compounds.
2. The element of claim 1 wherein the compounds of the mixture have one or more of the structures (I and II)

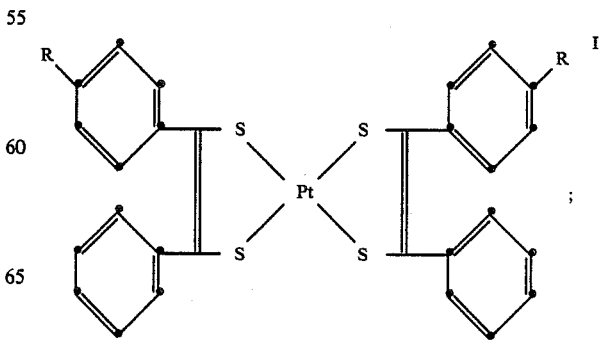

-continued

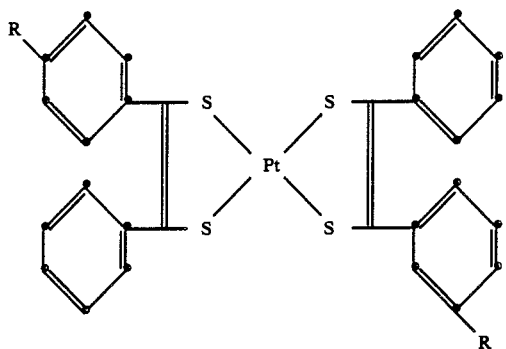

II wherein R, which is the same or different for Structures I and II, represents a lower alkyl or alkoxy group having up to 6 carbon atoms.

3. The element of claim 1 wherein the dye mixture is selected from the group consisting of:
Mixture (1) wherein
 Dye (I) R represents t-butyl
 Dye (II) R represents methoxy;
Mixture (2) wherein
 Dye (I) R represents t-butyl
 Dye (II) R represents isopropyl;
Mixture (3) wherein
 Dye (I) R represents methoxy
 Dye (II) R represents isopropyl;
Mixture (4) wherein
 Dye (I) R represents t-butyl
 Dye (II) R represents isopropyl
 Dye (III) R represents methyl;
Mixture (5) wherein
 Dye (I) R represents t-butyl
 Dye (II) R represents isopropyl
 Dye (III) R represents methyl
 Dye (IV) R represents 2-butyl; and
Mixture (6) wherein
Dye (I) R represents t-butyl
Dye (II) R represents isopropyl
Dye (III) R represents methoxy.

* * * * *